(12) United States Patent
Arnold

(10) Patent No.: US 8,950,288 B2
(45) Date of Patent: Feb. 10, 2015

(54) BICYCLE HANDLE

(75) Inventor: Franc Arnold, Koblenz (DE)

(73) Assignee: RTI Sports Vertrieb von Sportartikeln GmbH, Urmitz (DE)

( * ) Notice: Subject to any disclaimer, the term of this patent is extended or adjusted under 35 U.S.C. 154(b) by 1399 days.

(21) Appl. No.: 11/991,333

(22) PCT Filed: Aug. 30, 2006

(86) PCT No.: PCT/EP2006/065827
§ 371 (c)(1),
(2), (4) Date: Feb. 20, 2009

(87) PCT Pub. No.: WO2007/025990
PCT Pub. Date: Mar. 8, 2007

(65) Prior Publication Data
US 2009/0229403 A1    Sep. 17, 2009

(30) Foreign Application Priority Data
Aug. 30, 2005    (DE) .................... 20 2005 013 698 U

(51) Int. Cl.
*B62K 21/26*    (2006.01)
*B62K 21/12*    (2006.01)

(52) U.S. Cl.
CPC .............. *B62K 21/26* (2013.01); *B62K 21/125* (2013.01)
USPC ........... 74/551.9; 74/551.8; 74/551.1; 16/421

(58) Field of Classification Search
USPC ............ 74/551.1, 551.3, 551.4, 551.8, 551.9; 16/421; 24/279, 280, 284; 403/110, 403/191, 233–235, 290
See application file for complete search history.

(56) References Cited

U.S. PATENT DOCUMENTS

| | | | |
|---|---|---|---|
| 4,276,675 A * | 7/1981 | Pioch | 16/426 |
| 5,299,466 A * | 4/1994 | Heilbron et al. | 74/502.2 |
| 6,035,742 A | 3/2000 | Hollingsworth et al. | 74/551.9 |
| 6,263,759 B1 | 7/2001 | Hollingsworth et al. | 74/551.9 |
| 6,421,879 B1 * | 7/2002 | Gratz et al. | 16/422 |
| 7,814,812 B1 * | 10/2010 | Ziegahn et al. | 74/551.9 |
| 2004/0068844 A1 * | 4/2004 | Lumpkin | 16/421 |

FOREIGN PATENT DOCUMENTS

| | | | |
|---|---|---|---|
| DE | 425252 | 2/1926 | B62K 21/26 |
| DE | 94 07 010.5 | 4/1994 | |
| DE | WO99/39970 | 8/1999 | B62K 21/26 |
| EP | 1 440 877 | 2/2003 | |
| WO | WO01/02239 | 1/2001 | B62K 21/26 |
| WO | WO2004/033281 | 4/2004 | |
| WO | WO2005/021366 | 3/2005 | B62K 21/26 |

OTHER PUBLICATIONS

International Search Report dated Nov. 7, 2006 based on PCT application No. PCT/EP06/06587.

* cited by examiner

*Primary Examiner* — Thomas Diaz
(74) *Attorney, Agent, or Firm* — Ohlandt, Greeley, Ruggiero & Perle, LLP

(57) ABSTRACT

A bicycle handle, which is suitable in particular for trekking and mountain bikes, comprises a sleeve with a sleeve slot in it. The sleeve is connected to a grip element. For fastening the bicycle handle on a bicycle handlebar, the sleeve is mounted to the bicycle handlebar, and a clamping device is provided in a clamping region of the sleeve. A barend is connected to the clamping device. In order to avoid rotation of the barend, it is provided according to the disclosure that a rotation-prevention device is arranged between the clamping device and the bicycle handlebar.

12 Claims, 3 Drawing Sheets

BICYCLE HANDLE

BACKGROUND

1. Field of the Disclosure

The disclosure relates to a bicycle handle, particularly a bicycle handle for trekking bikes and mountain bikes.

2. Discussion of the Background Art

Bicycle handles comprise e.g. a cylindrical and preferably slotted sleeve, said sleeve being fastened to the bicycle handlebar by use of a clamping device. With the aid of the clamping device, the slotted sleeve is pressed together, thereby effecting a clamping attachment of the bicycle handle to the bicycle handlebar.

From WO 2005/021366, there is known a bicycle handle comprising a slotted sleeve to be mounted to a bicycle handlebar. Said sleeve is connected to a grip element. Further, the sleeve comprises a clamping region provided particularly on the outer side of the handle. For attaching the bicycle handle to the bicycle handlebar, a clamping device formed as a barend will be arranged to surround the clamping region of the sleeve. With the aid of a screw, the sleeve will then be clamped to the bicycle handlebar.

Known from U.S. Pat. No. 6,263,759 is a bicycle handle provided with a barend. The bicycle handle comprises a sleeve made of a relatively stiff material and adapted to be mounted to an end of the handlebar, which sleeve is surrounded by a grip element made of soft material. For positional fixation of the sleeve, the sleeve is on both of its ends provided with projections extending in the longitudinal direction. Said projections are configured to engage annular clamping devices which are also arranged on both sides of the bicycle handle. The two clamping devices have an annular shape and comprise a radial slot. Clamping is performed with the aid of a screw by reducing the width of the slot. The handlebar barend is separately fastened to the handlebar by use of a further clamping connection.

In case of relatively long barends, particularly when a mountain bike is used for a ride in the open landscape, it may happen that high forces and moments will occur in the region of the clamping connection. This effect may cause a rotational displacement of the barend. Particularly if the barend serves as a clamping device and surrounds a sleeve made of plastic or a similar material, creeping of the sleeve material may occur. Rotational displacement of the barend poses a considerable safety risk.

It is an object of the disclosure to provide a bicycle handle having a barend wherein a rotational displacement of the barend is avoided even in case of high forces.

SUMMARY OF THE DISCLOSURE

The bicycle handle of the disclosure, which is particularly provided as a bicycle handle for trekking bikes and mountain bikes, comprises a sleeve having a sleeve slot formed therein. The sleeve is provided to be mounted to a bicycle handlebar and comprises a clamping region arranged at an edge of the sleeve. Said sleeve slot preferably extends along the whole clamping region. The sleeve is connected to a grip element which is preferably made of a softer plastic. Alternatively, the sleeve and the grip element can be combined to form one integral piece. For fastening the bicycle handle to the bicycle handlebar, a clamping device is arranged in the clamping region of the sleeve; said clamping device can be connected to a barend, or the barend itself can have a suitable shape for serving as a clamping device so that the clamping device and the barend are formed as one integral piece. To avoid rotational displacement of the barend and/or of the bicycle handle which possibly does not comprise a barend, it is provided according to the disclosure that a rotation-prevention device is arranged between the clamping device, particularly the clamping device formed as a barend, and the bicycle handlebar. By the provision of such a rotation-prevention device, it is safeguarded that a rotational displacement of the barend is precluded even in case of high forces. This leads to a considerable improvement of safety.

Preferably, the rotation-prevention device is configured to surround the bicycle handlebar at least partially. The rotation-prevention device can especially have the shape of a ring or ring segment. Further, according to a particularly preferred embodiment, the rotation-prevention device is formed as a slotted ring. In such an arrangement, the ring preferably extends in the axial direction, i.e. in the longitudinal direction of the bicycle handlebar.

The above rotation-prevention device is preferably directly connected to the clamping device and respectively to the barend formed as the clamping device, and—if required—can also be formed as one integral component so that the clamping device and respectively the barend comprise an annular projection oriented in the direction of the handlebar. In the mounted condition, the rotation-prevention device is preferably arranged in contact with the outer side of the bicycle handlebar. Preferably, the rotation-prevention device is thus located immediately between the clamping device and the bicycle handlebar.

In a particularly preferred embodiment, the rotation-prevention device is further connected to said sleeve. This connection preferably is a form-fitting connection effected e.g. by a toothing arrangement or the like. Preferably, the rotation-prevention device or the sleeve includes a recess which extends in the axial direction and is engaged by a projection arranged on the sleeve or the rotation-prevention device and also extending in the axial direction. By the connection between the rotation-prevention device and the sleeve, it is further safeguarded that a rotational displacement of the grip element and respectively the sleeve on the bicycle handlebar is prevented. This is of advantage particularly in bicycle handles wherein the grip elements comprise a support element for support of the palm of the hand.

According to the disclosure, the clamping device preferably comprises an annular region or projection which fully surrounds the preferably also annular rotation-prevention device. This feature will guarantee a good transmission of forces and/or moments.

With particular preference, the clamping device comprises a clamping surface having the rotation-prevention device abutting thereon, having the rotation-prevention device connected thereto e.g. by bonding, and/or being connected to the clamping device by a form-fitting connection. Further, the clamping surface of the clamping device protrudes into the clamping region of the sleeve. Preferably, the whole clamping region of the sleeve is arranged within the clamping device and thus in complete abutment on the clamping surface.

The preferably annular rotation-prevention device has an outer diameter corresponding to the outer diameter of the sleeve in the clamping region. Preferably, thus, a cylindrical face is formed by the clamping region and the outer side of the rotation-prevention device. The clamping device preferably comprises a likewise cylindrical clamping surface, the diameter of the clamping device in the unclamped condition being slightly larger than the diameter of the cylindrical face formed by the outer side of the rotation-prevention device and by the corresponding outer region of the sleeve.

In a particularly preferred embodiment of the disclosure, the clamping device has a dual function since it is operative both for clamping the sleeve of the bicycle handle and for holding the barend by clamping. This dual function is obtained in that both the rotation-prevention device and the clamping region of the sleeve are arranged within the clamping device.

Since the rotation-prevention device is fastened to the bicycle handlebar preferably by a friction-fitting connection, the rotation-prevention device is preferably made of metal, particularly aluminum. By the provision of a rotation-prevention device produced from a relatively rigid material, the danger of a possible yielding of the material upon occurrence of high forces and moments is reduced. Particularly in case of a bicycle handle provided with a barend, the forces occurring on the free end of the barend and the resultant moments generated on the rotation-prevention device can be accommodated; thereby, a rotational displacement of the barend will be avoided even if large forces are generated.

With the aid of the rotation-prevention device of the disclosure, a torsional strength of the bicycle handle higher than 40 Nm, particularly higher than 50 Nm can be obtained. Thereby, it is safeguarded that also in case of occurrence of large forces particularly also on the barend, rotational displacement of the bicycle handle will be prevented. This is of high relevance under the safety aspect.

The clamping attachment of the bicycle handle, especially of the rotation-prevention device, is preferably performed with the aid of a screw. In a particularly preferred embodiment of the bicycle handle of the disclosure, said screw has a tightening torque of about 10 Nm.

Due to the inventive provision of a rotation-prevention device between the clamping device and the handlebar, and due to the fact that the clamping device extends also into a clamping region of the sleeve, it is already sufficient to provide only one clamping device. In a particularly preferred embodiment, the clamping device is connected to the barend and is thus arranged on the outer side of the handlebar and the bicycle handle, respectively. An additional clamping device on the inner side of the bicycle handle is not necessitated.

The provision of a the rotation-prevention device as a separate component offers the further advantage that the rotation-prevention device itself can be manufactured from a stiff material such as metal or aluminum, whereas the clamping device surrounding the rotation-prevention device can be made of a softer material such as e.g. a plastic and/or composite material. The resultant advantage resides in that the clamping devke itself can be shaped individually, particularly under the ergonomic aspect. Also the production of shapes of higher complexity is facilitated when using plastic. Especially if the clamping device and the barend are combined into one integral unit, the use of plastic is preferable since this will allow for an improved gripping comfort and for a cost reduction as well.

The disclosure will be explained in greater detail hereunder as exemplified by preferred embodiments thereof with reference to the accompanying drawings.

DETAILED DESCRIPTION OF THE PREFERRED EMBODIMENT

Figure 1:
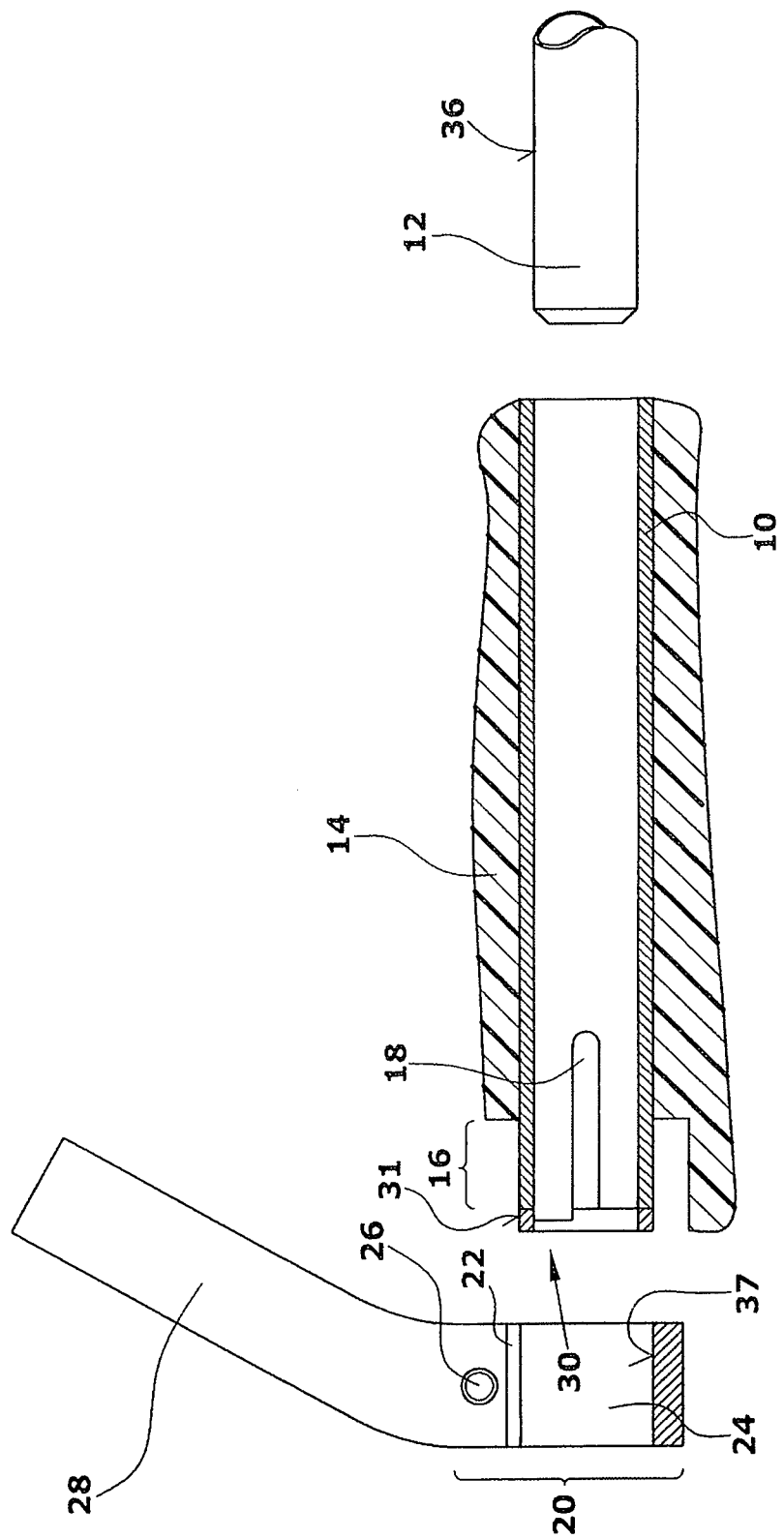
FIG. 1 shows a schematic sectional view of a first embodiment of a bicycle handle of the disclosure.

The bicycle handle comprises a sleeve 10 configured to be mounted to a bicycle handlebar 12. A grip element 14 is connected to sleeve 10. The connection between sleeve 10 and grip element 14 is effected e.g. by bonding. It can also be provided that the grip element 14 and the sleeve 10 are formed as one integral piece. Provided on one end of sleeve 10 is a clamping region 16, with a slot 18 extending preferably along the whole width of the clamping region.

With the aid of a clamping device 20 which in the illustrated embodiment is formed as a part of a barend 28, sleeve 10 is fastened to handlebar 12 by clamping. For this purpose, clamping device 20 is provided with a slot 22 extending throughout the width of clamping device 20.

Clamping device 20 includes a cylindrical interior space 24, with the inner diameter thereof corresponding to the outer diameter of sleeve 10 in the clamping region 16. With the aid of a screw or another fastening element, the inner diameter of the cylindrical portion 24 of clamping device 20 can be reduced by advancing said screw into a threaded bore 26. In this manner, the slotted sleeve 10 will be clamped to handlebar 12. In order to avoid a rotational displacement of barend 28 connected to clamping device 20, which might occur especially in case of high forces, a rotation-prevention device 30 is provided. High forces tend to occur particularly if the barend 28 has a large length and/or is seized on its outer end. Further, high forces will occur particularly when riding a bicycle on outdoor terrain.

Figure 4:
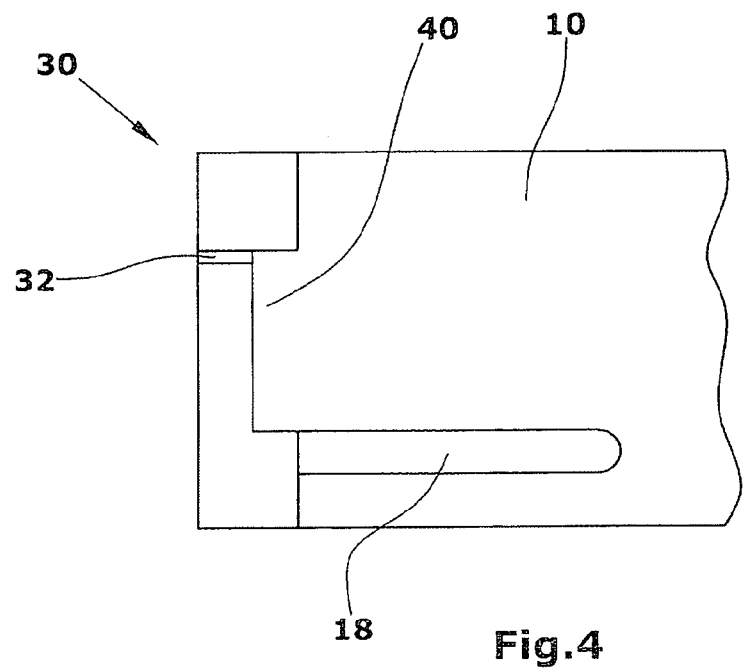
FIG. 4 shows an enlarged schematic plan view of the clamping region.

The rotation-prevention device 30 comprises a slot 32 formed in the axial direction, i.e. in the longitudinal direction of handlebar 12, and has an annular shape. The slot 32 has a different circumferential position than the sleeve slot 18, as seen in FIG. 4. In the mounted condition, an inner side 34 of rotation-prevention device 30 is arranged in abutment on an outer side 36 (FIG. 1) of bicycle handlebar 12, wherein, due to the friction prevailing between the rotation-prevention device 30 and the bicycle handlebar 12, a rotational displacement of barend 28 is avoided even in situations of high forces.

Thus, in the particularly preferred embodiment illustrated in the drawings, the clamping device 20 comprises a cylindrical clamping surface 37. The width of clamping surface 37, i.e. the dimension of clamping surface 37 in the longitudinal direction of handlebar 12, corresponds to the sum of the widths of rotation-prevention device 30 and of clamping region 16. An outer side 31 of rotation-prevention device 30 is also cylindrical and has the same diameter as the clamping region 16 which itself also forms a cylindrical face.

Particularly, the rotation-prevention device 30 comprises a recess 38. This recess 38 is engaged by a projection 40 (FIG. 4) of sleeve 10. This engagement is effective to prevent a rotational displacement of the rotation-prevention device relative to sleeve 10. Thus, the rotation-prevention device 30 safeguards that the barend 28 is not allowed to rotate relative to the sleeve 10 and respectively the grip element 14 connected to sleeve 10, as well as relative to the handlebar 12.

Figure 2:
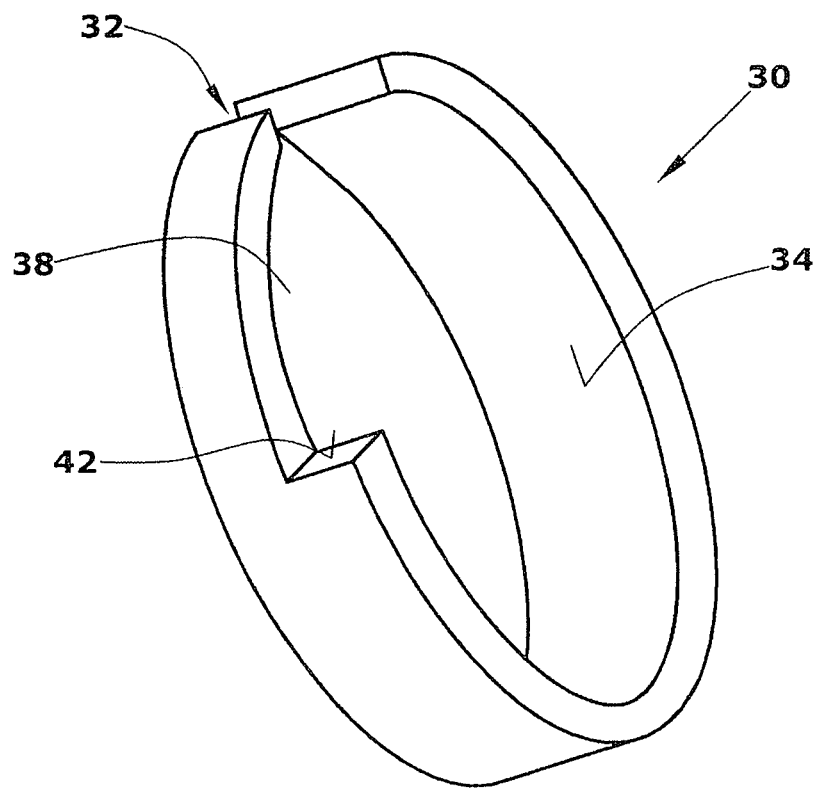
FIG. 2 shows a schematic perspective view of the rotation-prevention device.
Figure 3:
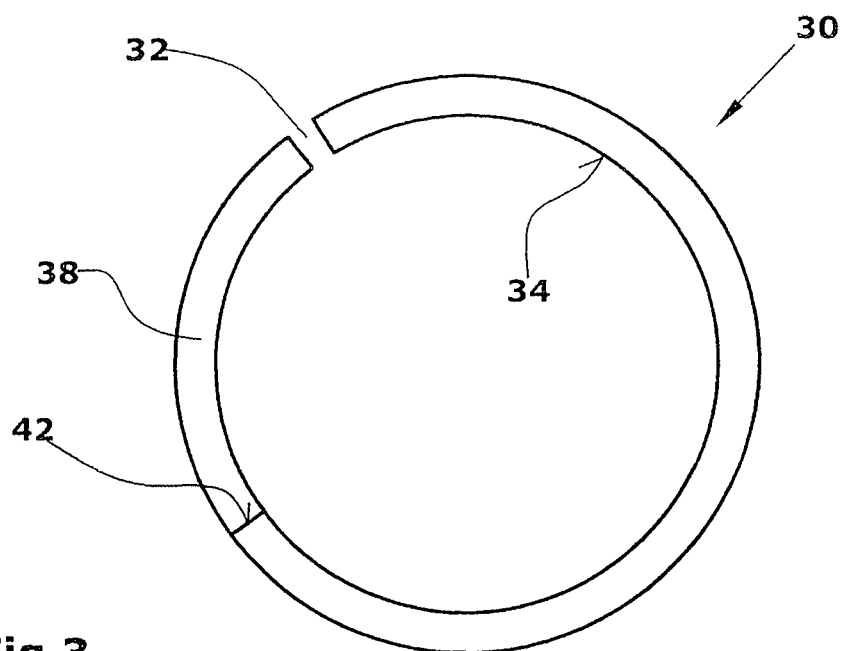
FIG. 3 shows a schematic plan view of the rotation-prevention device.

Of course, also a plural number of the above toothing arrangements 38, 40 can be provided so as to reduce the forces acting on a flank 42 of recess 30 (FIG. 2).

Figure 5:
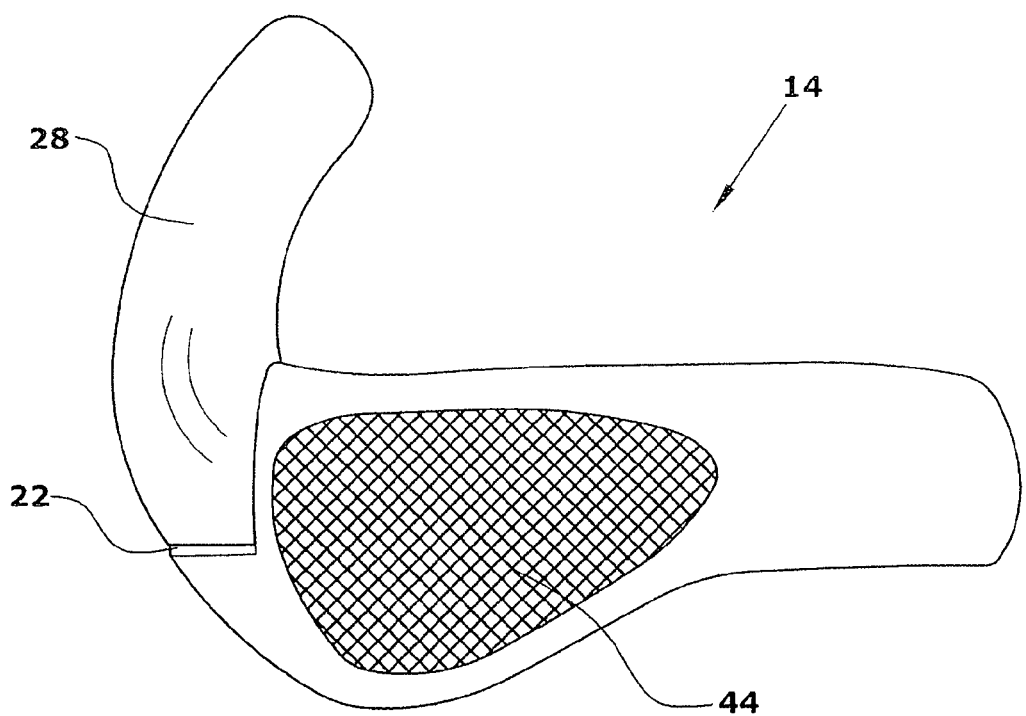
FIG. 5 shows a schematic perspective view of a second embodiment of the bicycle handle.

A further embodiment of the disclosure illustrated in FIG. 5 relates to a bicycle handle whose interior configuration corresponds to the configuration shown in FIG. 1. The design of the grip element 14, however, is different in that a support element 44 is connected to grip element 14 or is formed as an integral part of grip element 14. Support element 44 serves for support of the palm of a hand, thus resulting in an ergonomically shaped handle.

The invention claimed is:

1. A bicycle handle, comprising:
 a sleeve having a sleeve slot formed therein and being provided to be mounted to a bicycle handlebar, said sleeve comprising a clamping region arranged at an edge of said sleeve,
 a clamping device at least partially arranged in said clamping region of said sleeve to reduce a width of the sleeve slot,
 a grip element connected to said sleeve, and
 a rotation-prevention device arranged between said clamping device and the bicycle handlebar to directly frictionally engage the bicycle handlebar and to prevent rotation of said clamping device with respect to said sleeve, wherein said rotation-prevention device has an axial slot with a different position than said sleeve slot.

2. The bicycle handle according to claim 1, wherein said rotation-prevention device at least partially surrounds the bicycle handlebar.

3. The bicycle handle according to claim 1, wherein said rotation-prevention device is of an annular shape.

4. The bicycle handle according to claim 1, wherein said rotation-prevention device is arranged adjacent to said clamping region of said sleeve.

5. The bicycle handle according to claim 1, wherein said rotation-prevention device has an outer diameter that has substantially a same size as an outer diameter as said clamping region of said sleeve.

6. The bicycle handle according to claim 1, wherein said clamping device completely surrounds said rotation-prevention device.

7. The bicycle handle according to claim 1, wherein said clamping device comprises a clamping surface being abutted by said rotation-prevention device and extending into said clamping region of said sleeve.

8. The bicycle handle according to claim 1, wherein said rotation-prevention device is connected to said sleeve.

9. The bicycle handle according to claim 8, wherein one of said rotation-prevention device or said sleeve comprises an axially extending recess which is engaged by an axially extending projection arranged on another of said sleeve or said rotation-prevention device.

10. The bicycle handle according to claim 1, wherein said rotation-prevention device is connected to said sleeve by a form-fitting connection.

11. The bicycle handle according to claim 1, wherein said rotation-prevention device is made of metal.

12. The bicycle handle according to claim 1, further comprising a bar end which is connected to said clamping device.

* * * * *